(12) United States Patent
Futter (10) Patent No.: US 8,411,045 B2
(45) Date of Patent: *Apr. 2, 2013

(54) TOUCH SENSITIVE DISPLAYS WITH COPLANAR CAPACITIVE TOUCH AND PROXIMITY SENSOR PADS AND RELATED TOUCH PANELS

(75) Inventor: Paul Leonard Futter, Cary, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1142 days.

This patent is subject to a terminal disclaimer.

(21) Appl. No.: 12/334,871

(22) Filed: Dec. 15, 2008

(65) Prior Publication Data

US 2010/0149126 A1 Jun. 17, 2010

(51) Int. Cl.
*G06F 3/041* (2006.01)
(52) U.S. Cl. .......................................... 345/173
(58) Field of Classification Search .................. 345/173
See application file for complete search history.

(56) References Cited

U.S. PATENT DOCUMENTS

| | | | | |
|---|---|---|---|---|
| 6,104,819 | A * | 8/2000 | Nickum | 381/123 |
| 2007/0222766 | A1 * | 9/2007 | Bolender | 345/173 |
| 2008/0246723 | A1 * | 10/2008 | Baumbach | 345/156 |
| 2011/0002143 | A1 * | 1/2011 | Saarikko et al. | 362/611 |

FOREIGN PATENT DOCUMENTS

| | | |
|---|---|---|
| EP | 0 770 971 A2 | 5/1997 |
| GB | 2 428 804 A | 2/2007 |

OTHER PUBLICATIONS

Notification of Transmittal of the International Preliminary Report on Patentability; International Preliminary Report on Patentability corresponding to International Application No. PCT/US2009/003892; Date of Mailing: Feb. 21, 2011; 17 pages.
Invitation to Pay Additional Fees and, Where Applicable, Protest Fee, PCT International Application No. PCT/US2009/003892, Nov. 27, 2009.
International Search Report and Written Opinion, PCT International Application No. PCT/US2009/003892, Feb. 8, 2010.

* cited by examiner

*Primary Examiner* — William Boddie
*Assistant Examiner* — Sahlu Okebato
(74) *Attorney, Agent, or Firm* — Myers Bigel Sibley & Sajovec, P.A.

(57) ABSTRACT

An electronic touch panel includes a plurality of spaced apart touch sensor pads that are arranged in a first direction on a planar layer. A proximity sensor pad is on the planar layer and is electrically isolated from the touch sensor pads. The proximity sensor pad has a greater surface area than a plurality of the touch sensor pads. A position detection circuit is configured to electrically charge the touch sensor pads to generate capacitive coupling to an adjacent user object and to detect therefrom a location of the user object relative to the first direction across the planar layer, and configured to electrically charge the proximity sensor pad to generate a higher level of capacitive coupling to the user object than a plurality of the touch sensor pads and to detect therefrom a proximity of the user object in a perpendicular direction to the planar layer. The proximity sensor pad may extend as a continuous line on the planar layer between adjacent spaced apart columns of the touch sensor pads.

19 Claims, 6 Drawing Sheets

TOUCH SENSITIVE DISPLAYS WITH COPLANAR CAPACITIVE TOUCH AND PROXIMITY SENSOR PADS AND RELATED TOUCH PANELS

FIELD OF THE INVENTION

This invention relates to user interfaces for electronic devices, and more particularly to touch sensitive displays for electronic devices such as wireless communication terminals.

BACKGROUND OF THE INVENTION

Touch sensitive displays are becoming a popular interface on electronic devices for users to enter commands and data used in the operation of the device. Touch sensitive displays can now be found in mobile telephones, particularly portable music players, PDA (personal digital assistant) devices, and cellular telephones having integrated PDA features and other phone operation related features. The touch sensitive displays are generally designed to operate and respond to a finger touch, a stylus touch, or finger/stylus movement on the touch screen surface. Touch sensitive displays may be used in addition to, in combination with, or in place of physical keys traditionally used in a cellular phone to carry out the phone functions and features.

Touching a specific point on the display may activate a virtual button, feature, or function found or shown at that location on the display. Typical phone features which may be operated by touching the display include entering a telephone number, for example, by touching virtual keys of a virtual keyboard shown on the display, making a call or ending a call, bringing up, adding to or editing and navigating through an address book, and other phone functions such as text messaging, wireless connection to a wide area network, and other phone functions.

Commercial pressures to provide far more functionality within smaller physical device sizes are continuing to drive the need to provide more accurate determination of touch locations on a display.

SUMMARY OF THE INVENTION

In some embodiments, an electronic touch panel includes a plurality of spaced apart touch sensor pads that are arranged in a first direction on a planar layer. A proximity sensor pad is on the planar layer and is electrically isolated from the touch sensor pads. The proximity sensor pad has a greater surface area than a plurality of the touch sensor pads. A position detection circuit is configured to electrically charge the touch sensor pads to generate capacitive coupling to an adjacent user object and to detect therefrom a location of the user object relative to the first direction across the planar layer, and configured to electrically charge the proximity sensor pad to generate a higher level of capacitive coupling to the user object than a plurality of the touch sensor pads and to detect therefrom a proximity of the user object in a perpendicular direction to the planar layer.

The position detection circuit may include a comparator circuit that generates a proximity signal that identifies when a charge level of the proximity sensor pad reaches a threshold level to indicate that the user object has become proximately located to the proximity sensor pad and/or that the user object is no longer proximately located to the proximity sensor pad.

The comparator circuit may generate a position signal that identifies when a charge level of a defined one or more of the touch sensor pads reaches a threshold level to indicate that the user object is nearly touching or touching the defined one or more of the touch sensor pads.

The touch sensor pads may be arranged in a plurality of spaced apart columns, with each of the touch sensor pads being serially connected in each column and electrically isolated from touch sensor pads in other columns. The proximity sensor pad may extend as a continuous line on the planar layer between adjacent ones of the spaced apart columns of touch sensor pads.

The proximity sensor pad may be wider than conductive lines that serially connect the touch sensor pads in each of the columns.

The touch sensor pads may be arranged in a plurality of spaced apart columns, with each of the touch sensor pads being serially connected in each column and electrically isolated from touch sensor pads in other columns. The proximity sensor pad may include a plurality of sub-pads between adjacent ones of the spaced apart columns of touch sensor pads and that are serially connected by a line that meanders around the columns of touch sensor pads.

Each of the sub-pads forming the proximity sensor pad may extend across at least a major portion of regions between different adjacent ones of the spaced apart columns of touch sensor pads.

The touch sensor pads may be further arranged in a plurality of spaced apart columns, with each of the touch sensor pads being serially connected in each column and electrically isolated from touch sensor pads in other columns. The proximity sensor pad may extend as a continuous line around at least a major outside periphery of the columns of touch sensor pads.

The proximity sensor pad may be wider than conductive lines that serially connect the sensor pads in each of the columns.

The touch sensor pads may be arranged in a plurality of spaced apart columns and a plurality of spaced apart rows. The touch sensor pads in each of the columns may be serially connected to each other and electrically isolated from the touch sensor pads in other columns. The touch sensor pads in each of the rows may be serially connected to each other and are electrically isolated from the touch sensor pads in other rows. The proximity sensor pad may extend as a continuous line around at least a major outside periphery of the rows and columns of the touch sensor pads. The position detection circuit may be further configured to detect a location of the user object relative to the columns of touch sensor pads, relative to the rows of touch sensor pads, and relative to the proximity sensor pad in a perpendicular direction to the columns and rows of the touch sensor pads.

The electronic touch panel may further include a liquid crystal display with an image rendering layer that is configured to control light transmissivity through pixel locations therein responsive to a display control signal and a metallic reflector layer that is configured to direct light through the image rendering layer. The metallic reflector layer may include the proximity sensor pad.

The proximity sensor pad may extend along at least a majority of edge regions of the image rendering layer.

The electronic touch panel may further include a liquid crystal display with an image rendering layer that is configured to control light transmissivity through pixel locations therein responsive to a display control signal. The rows and columns of touch sensor pads and the proximity sensor pad may extend parallel to a plane of the liquid crystal display. The position detection circuit may be further configured to generate a position signal that indicates a location of the user object relative the plane of the image rendering layer in response to relative charge levels of the touch sensor pads and relative to a direction away from the plane of the image rendering layer in response to a charge level of the proximity sensor pad.

A controller may include a user application that is configured to determine from the position signal a three dimensional location of the user object relative to an image that is displayed by the image rendering layer.

The electronic touch panel may further include a liquid crystal display with an image rendering layer that is configured to control light transmissivity through pixel locations therein responsive to a display control signal and a metallic reflector layer that is configured to direct light through the image rendering layer. The metallic reflector layer may include the proximity sensor pad.

A liquid crystal display may include an image rendering layer that is configured to control light transmissivity through pixel locations therein responsive to a display control signal, wherein the touch sensor pads and the proximity sensor pad extend parallel to a plane of the liquid crystal display. The position detection circuit may be further configured to generate a position signal that indicates a location of the user object relative the plane of the image rendering layer in response to relative charge levels of the touch sensor pads and relative to a direction away from the plane of the image rendering layer in response to a charge level of the proximity sensor pad.

A controller circuit may be configured to turn on backlighting for a display device in response to the position detection circuit detecting through the proximity sensor pad that the user object has become proximately located thereto.

The controller circuit may be configured to trigger a wireless terminal to answer an incoming phone call in response to the position detection circuit detecting through the proximity sensor pad that the user object has become proximately located thereto.

The controller circuit may be configured to selectively connect an ear speaker to an audio channel and to disconnect a loudspeaker from the audio channel in response to the position detection circuit detecting through the proximity sensor pad that the user object has become proximately located thereto, and to disconnect the ear speaker from the audio channel and to connect the loudspeaker to the audio channel in response to the position detection circuit detecting through the proximity sensor pad that the user object has become not proximately located thereto.

Some other embodiments are directed to a touch sensitive display that includes an image rendering layer, a plurality of touch sensor pads, a proximity sensor pad, and a position detection circuit. The image rendering layer is configured to control light transmissivity through pixel locations therein responsive to a display control signal. The plurality of touch sensor pads are arranged in a plurality of spaced apart columns on a planar layer that is connected to the image rendering layer. Each of the touch sensor pads are spaced apart and serially connected in each column and are electrically isolated from first sensor pads in other columns. The proximity sensor pad is on the planar layer and electrically isolated from the touch sensor pads. The proximity sensor pad has a greater surface area than a plurality of the touch sensor pads and extends as a continuous line on the planar layer between adjacent ones of the spaced apart columns of touch sensor pads. The position detection circuit is configured to electrically charge the touch sensor pads to generate capacitive coupling to an adjacent user object and detect therefrom a location of the user object relative to a direction across the image rendering layer, and configured to electrically charge the proximity sensor pad to generate a higher level of capacitive coupling to the user object than a plurality of the touch sensor pads and to detect therefrom a proximity of the user object in a perpendicular direction to the image rendering layer.

Other touch panels, touch sensitive displays, methods, and/or computer program products according to embodiments of the invention will be or become apparent to one with skill in the art upon review of the following drawings and detailed description. It is intended that all such additional touch panels, touch sensitive displays, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/"

includes any and all combinations of one or more of the associated listed items. In the drawings, the size and relative sizes of regions and elements and the distances therebetween may be exaggerated for clarity. Like numbers refer to like elements throughout.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some embodiments may be embodied in hardware (including analog circuitry and/or digital circuitry) and/or in software (including firmware, resident software, micro-code, etc.). Consequently, as used herein, the term "signal" may take the form of a continuous waveform and/or discrete value (s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "circuit" and "controller" may take the form of digital circuitry, such as a logic gate array and/or computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although some embodiments of the present invention are described in the context of wireless communication terminals for purposes of illustration and explanation only, the present invention is not limited thereto. It is to be understood that the present invention can be more broadly used in any sort of electronic touch panel to identify the location of user touches and proximity of the user to the touch panel.

In accordance with some embodiments, an electronic touch panel is configured to sense the proximity of a user object (e.g., finger, stylus, or other object manipulated by a user) using capacitive coupling thereto. For example, a plurality of spaced apart touch sensor pads can be arranged in a first direction across a planar layer. A proximity sensor pad also located on the planar layer and is electrically isolated from the touch sensor pads. The proximity sensor pad has a greater surface area than a plurality of the touch sensor pads, and may have a greater surface area than the combined surface areas of the individual touch sensor pads. A position detection circuit is configured to detect a location of a user object relative to the first direction across the first planar layer in response to relative charged levels of the touch sensor pads and to detect proximity of the user object relative to a direction away from the planar layer in response to a charge level of the proximity sensor pad.

Figure 1:
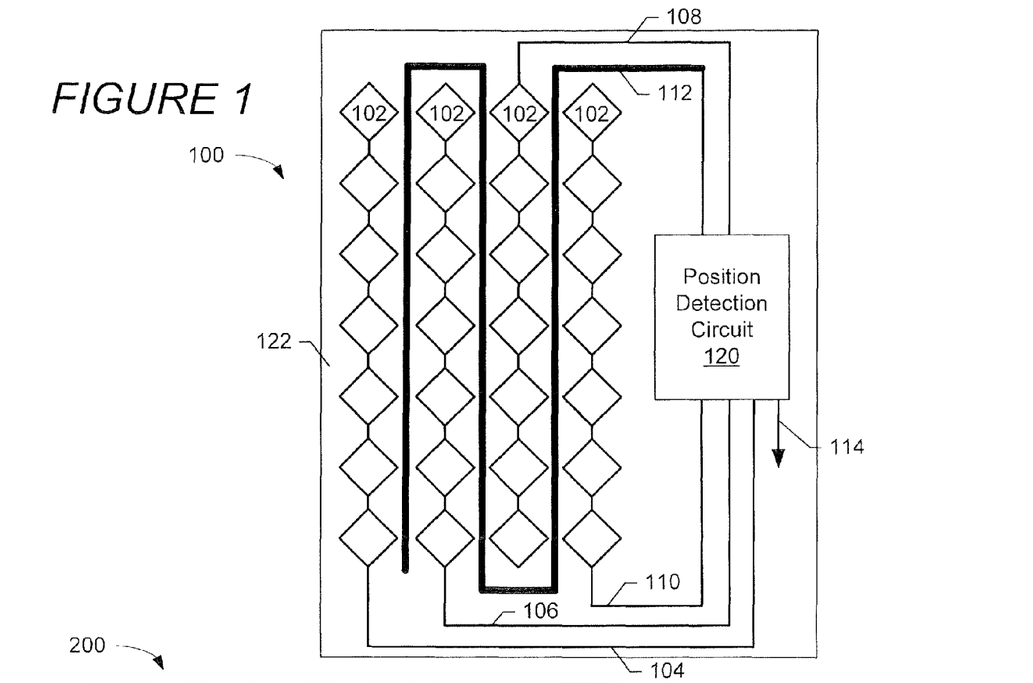
FIG. 1 is a plan view of a portion of a touch panel with capacitive proximity sensing capability according to some embodiments of the present invention.

An exemplary embodiment of a touch panel 100 with capacitive proximity sensing capability is shown by a plan view in FIG. 1. Referring to FIG. 1, the touch panel 100 includes a plurality of touch sensor pads 102 that are arranged in a plurality of spaced apart columns on a supporting planar layer 122. Each of the touch sensor pads 102 are spaced apart and serially connected in each column, via respective conductive lines 104-110, and are electrically isolated from touch sensor pads 102 in other columns. A proximity sensor pad 112 extends as a continuous line on the planar layer 122 between adjacent ones of the spaced apart columns of touch sensor pads 102. The proximity sensor pad 112 is wider than the conductive lines 104-110 that serially connect the touch sensor pads 102 in each of the columns.

A position detection circuit 120 is configured to electrically charge separate columns of the touch sensor pads 102, via the lines 104-110, to generate capacitive coupling to an adjacent user object and to detect therefrom a location of the user object relative to the touch sensor pads 102 in a direction across the layer 122. The position detection circuit 120 is further configured to electrically charge the proximity sensor pad 112 to generate a higher level of capacitive coupling to the user object than a plurality of the touch sensor pads 102, and to detect therefrom a proximity of the user object relative to a perpendicular direction (Z direction) away from the layer 122.

The position detection circuit 120 can generate one or more proximity/position signal(s) 114 that may indicate that a user object has become proximately located to the proximity sensor pad 112, that the user object is no longer proximately located to the proximity sensor pad 112, and/or to indicate a location of the user object relative to the touch sensor pads 102 in a direction across the layer 122. For example, the proximity/position signal(s) 114 may indicate a distribution of charge across the columns of touch sensor pads 102 on the plane 120 so as to identify where the user object is effectively touching the touch panel 100. Accordingly, the position detection circuit 120 may indicate through the proximity/position signal(s) 114 a three-dimensional location of the user object relative to the touch panel 100.

Because the proximity sensor pad 112 has a much greater surface area than the individual touch sensor pads 102, the position detection circuit 120 can create a much higher charge on the proximity sensor pad 112 to generate a much higher field strength therefrom that may be used to sense capacitive coupling between the proximity sensor pad 112 and a proximately located user object at a much greater distance that can be sensed through any capacitive coupling between individual ones of the touch sensor pads 102 and the user object. Accordingly, the position detection circuit 120 can use the proximity sensor pad 112 to sense whether a user object is proximately located to the touch panel 100, and may be further configured to determine from a level of capacitive coupling between the proximity sensor pad 112 and the user object a perpendicular distance that the user object is away from the proximity sensor pad 112. The position detection circuit 120 may, for example, determine the distance between the touch panel 100 and the user object based on a level of charge resident on the proximity sensor pad 112 and a known relationship between charge levels and approximate distances to a user object that is capacitively coupled thereto.

The position detection circuit 120 can include a comparator circuit that generates the proximity/position signal(s) 114 in response to at least a threshold change in a charge level of the proximity sensor pad 112, so as to indicate that a user object has become proximately located to the proximity sensor pad 112 and/or that the user object is no longer proximately located to the proximity sensor pad 112.

Alternatively or additionally, the comparator circuit may generate the proximity signal(s) 114 in response a charge level of the proximity sensor pad 112 changing at least a threshold amount relative to a charge level of at least one of, or a column of, the touch sensor pads 102, to indicate that a user object has become proximately located to the proximity sensor pad 112 and/or that the user object is no longer proximately located to the proximity sensor pad 112.

The comparator circuit may generate the proximity signal(s) 114 to identify when a charge level of a defined one or more of the touch sensor pads 102 reaches a threshold level to indicate that the user object is touching or nearly touching the defined one or more of the first sensor pads.

It is to be understood that the embodiment shown in FIG. 1 is provided for purposes of explanation of various exemplary concepts of the invention to those skilled in the art, however the invention is not limited thereto. Accordingly, although the touch sensor pads have been illustrated as being generally square/diamond shaped along a plane, they are not limited thereto and may be any shape that provides a conductive surface which can be charged to provide capacitive coupling to a user object. Moreover, although only several touch sensor pads have been illustrated in each column, it is to be understood that any number may be used and when included as part of a touch screen interface may include substantially more columns, and may further include serially connected rows of the touch sensor pads, arranged therein to provide a enable more precise determination of the location of a user's touch relative to the matrix of touch sensor pads. In the drawings, the relative thicknesses and relative sizes of the touch and proximity sensor pads are exaggerated for ease of illustration and reference.

Figure 2:
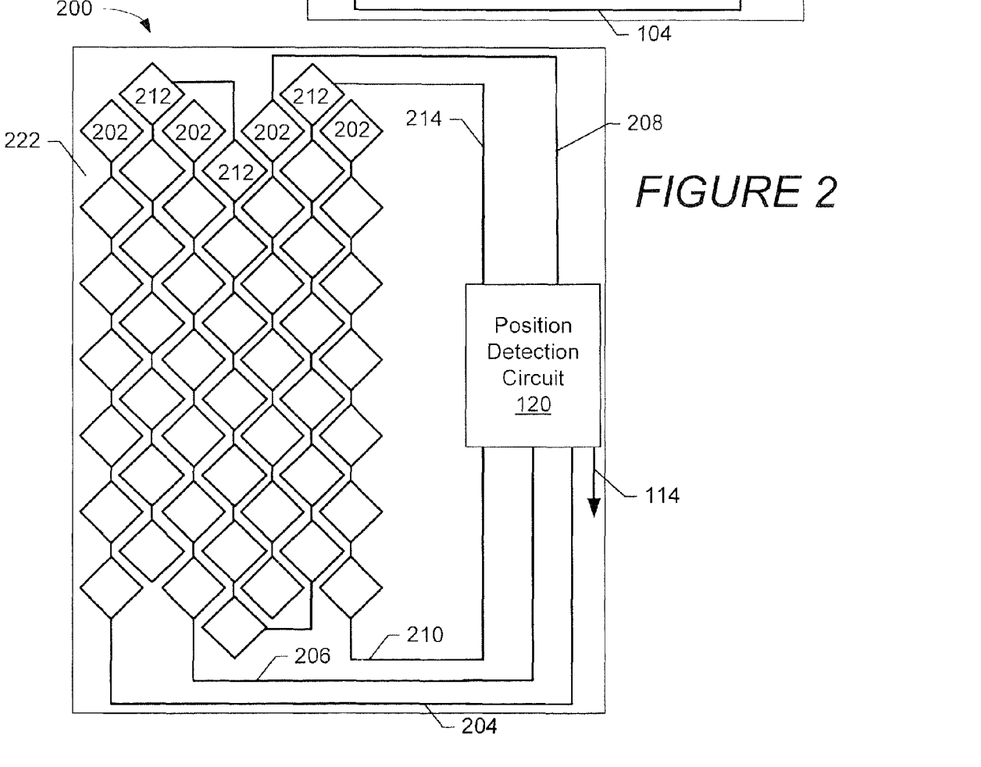
FIG. 2 is a plan view of a portion of a touch panel with capacitive proximity sensing capability according to some other embodiments of the present invention.

Another exemplary embodiment of a touch panel 200 with capacitive proximity sensing capability is shown by a plan view in FIG. 2. Referring to FIG. 2, the touch panel 200 includes a plurality of touch sensor pads 202 that are arranged in a plurality of spaced apart columns on a supporting planar layer 222. Each of the touch sensor pads 202 are spaced apart and serially connected in each column, via respective conductive lines 204-210, and are electrically isolated from touch sensor pads 202 in other columns.

A proximity sensor pad extends as a plurality of sub-pads 212 on the layer 222 between adjacent ones of the spaced apart columns of touch sensor pads 202. The sub-pads are serially connected by a continuous line 214 that meanders around the columns of touch sensor pads 202. Each of the sub-pads 212 forming the proximity sensor pad extend across at least a major portion of regions between different adjacent ones of the spaced apart columns of touch sensor pads 202. Because the electrically connected proximity sensor sub-pads 212 have a much greater combined surface area than the individual touch sensor pads 202, the position detection circuit 120 can create a much higher charge on the proximity sensor sub-pads 212 to generate a much higher field strength therefrom that may be used to sense capacitive coupling between the proximity sensor sub-pads 212 and a proximately located user object at a much greater distance that can be sensed through any capacitive coupling between individual ones of the touch sensor pads 202 and the user object.

The position detection circuit 120 may operate as described above with regard to FIG. 1 to generates the proximity/position signal(s) 114 in response to at least a threshold change in a charge level of the proximity sensor sub-pads 212, so as to indicate that a user object has become proximately located to the touch panel 200 and/or that the user object is no longer proximately located to the touch panel 200. Alternatively or additionally, the position detection circuit 120 may generate the proximity signal(s) 114 in response a charge level of the proximity sensor sub-pads 212 changing at least a threshold amount relative to a charge level of at least one of, or a column of, the touch sensor pads 202, to indicate that a user object has become proximately located to the touch panel 200 and/or that the user object is no longer proximately located to the touch panel 200. The position detection circuit 120 may generate the proximity signal(s) 114 to identify when a charge level of a defined one or more of the touch sensor pads 202 reaches a threshold level to indicate that the user object is touching or nearly touching the defined one or more of the first sensor pads.

Figure 3:
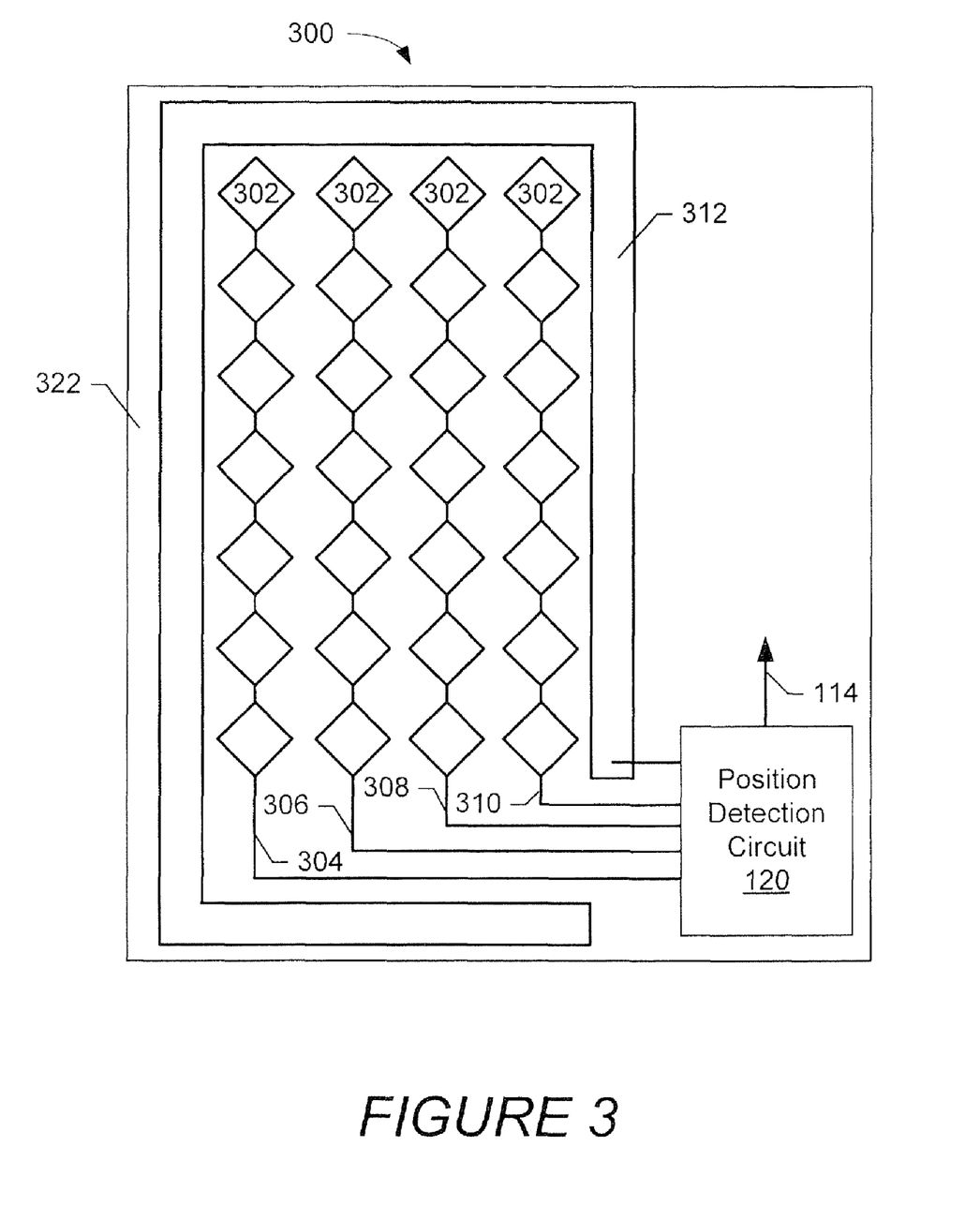
FIG. 3 is a plan view of a portion of a touch panel with capacitive proximity sensing capability according to some other embodiments of the present invention.

Another exemplary embodiment of a touch panel 300 with capacitive proximity sensing capability is shown by a plan view in FIG. 3. Referring to FIG. 3, the touch panel 300 includes a plurality of touch sensor pads 302 that are arranged in a plurality of spaced apart columns on a supporting planar layer 322. Each of the touch sensor pads 302 are spaced apart and serially connected in each column, via respective conductive lines 304-310, and are electrically isolated from touch sensor pads 302 in other columns.

A proximity sensor pad 312 extends as a continuous line on the layer 222 around at least a major outside periphery of the columns of touch sensor pads 302. The proximity sensor pad 312 is wider than the conductive lines 304-310 that serially connect the touch sensor pads 302 in each of the columns. The resulting surface area of the proximity sensor pad 312 is greater than the surface area of a plurality of the touch sensor pads 302, so that the position detection circuit 120 can create a much higher charge on the proximity sensor pad 312 to generate a much higher field strength therefrom that may be used to sense capacitive coupling between the proximity sensor pad 312 and a proximately located user object at a much greater distance that can be sensed through any capacitive coupling between individual ones of the touch sensor pads 302 and the user object.

The position detection circuit 120 may operate as described above with regard to FIG. 1 to generates the proximity/position signal(s) 114 in response to at least a threshold change in a charge level of the proximity sensor pad 312, so as to indicate that a user object has become proximately located to the touch panel 300 and/or that the user object is no longer proximately located to the touch panel 300. Alternatively or additionally, the position detection circuit 120 may generate the proximity signal(s) 114 in response a charge level of the proximity sensor pad 312 changing at least a threshold amount relative to a charge level of at least one of, or a column of, the touch sensor pads 302, to indicate that a user object has become proximately located to the touch panel 300 and/or that the user object is no longer proximately located to the touch panel 300. The position detection circuit 120 may generate the proximity signal(s) 114 to identify when a charge level of a defined one or more of the touch sensor pads 302 reaches a threshold level to indicate that the user object is touching or nearly touching the defined one or more of the first sensor pads.

Figure 4:
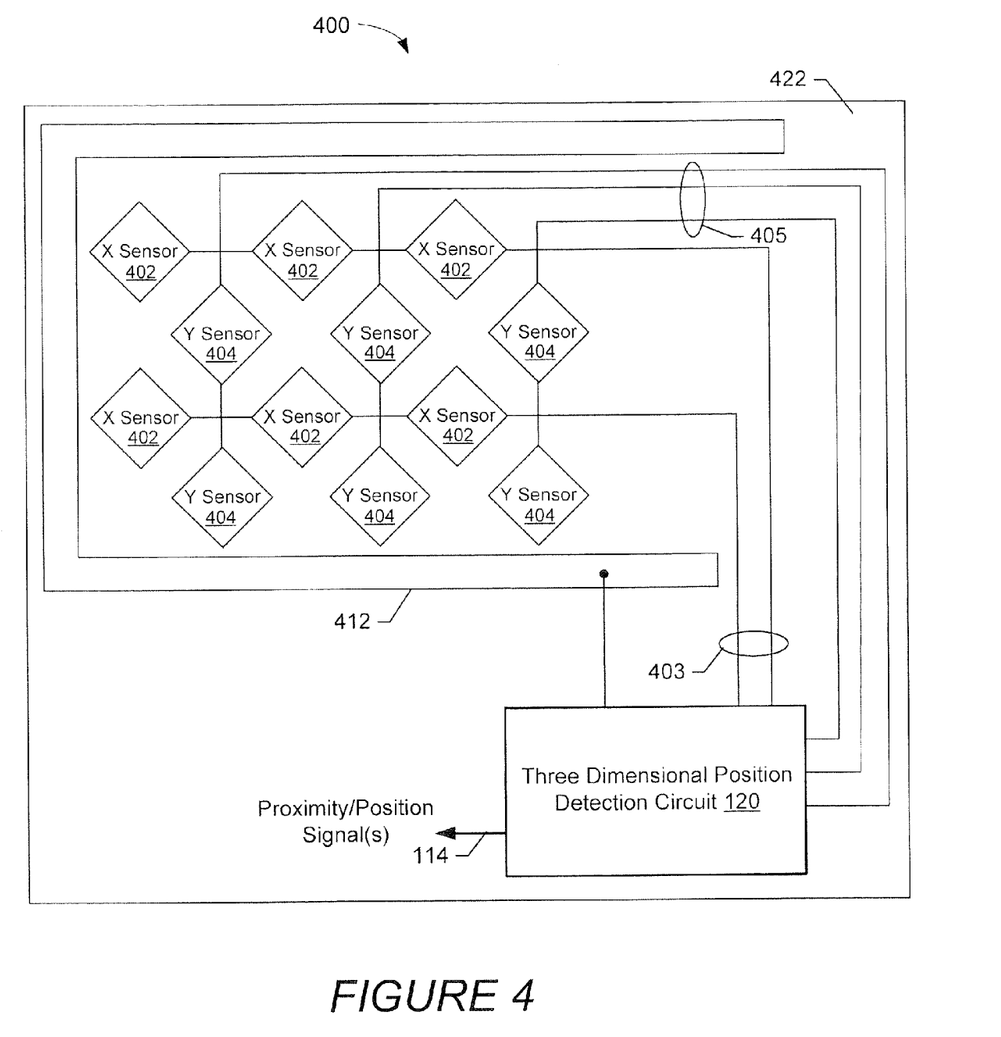
FIG. 4 is a plan view of a portion of a touch panel with capacitive proximity sensing capability according to some other embodiments of the present invention.

Another exemplary embodiment of a touch panel 400 with capacitive proximity sensing capability is shown by a plan view in FIG. 4. Referring to FIG. 4, the touch panel 400 includes a plurality of touch sensor pads 402 that are arranged in a plurality of spaced apart rows on a supporting planar layer 422. Each of the touch sensor pads 402 are spaced apart and serially connected in each row, via respective conductive lines 403, and are electrically isolated from touch sensor pads 402 in other rows. The touch panel 400 further includes a plurality of touch sensor pads 404 that are arranged in a plurality of spaced apart columns on the supporting planar layer 422. Each of the touch sensor pads 404 are spaced apart and serially connected in each column, via respective conductive lines 405, and are electrically isolated from touch sensor pads 404 in other rows.

A proximity sensor pad 412 extends as a continuous line on the layer 422 around at least a major outside periphery of the rows of touch sensor pads 402 and columns of touch sensor pads 404. The proximity sensor pad 412 is wider than individual ones of, and may be wider than the combined, conductive lines 403 and 405 that serially connect the respective rows and columns of touch sensor pads 402 and 404. The resulting surface area of the proximity sensor pad 412 is greater than the surface area of a plurality of the touch sensor pads 402 and 404, so that the position detection circuit 120 can create a much higher charge on the proximity sensor pad 412 to generate a much higher field strength therefrom that may be used to sense capacitive coupling between the proximity sensor pad 412 and a proximately located user object at a much greater distance that can be sensed through any capacitive coupling between individual ones of the touch sensor pads 402 and 404 and the user object.

The position detection circuit 120 may operate as described above with regard to FIG. 1, but may be further configured to determine a user touch position relative to the rows and columns of touch sensor pads 402 and 404. The position detection circuit 120 can electrically charge separate rows of the touch sensor pads 102, via lines 403, to generate capacitive coupling to an adjacent user object and to detect therefrom a location of the user object relative to the touch sensor pads along the X direction across the layer 422. The position detection circuit 120 electrically charges separate columns of the touch sensor pads 404, via lines 405, to generate capacitive coupling to an adjacent user object and to detect therefrom a location of the user object relative to the touch sensor pads 404 along the Y direction across the layer 422. The position detection circuit 110 also electrically charges the proximity sensor plate 412 to generate a higher level of capacitive coupling to the user object than by a plurality of the rows and columns of touch sensor pads 402 and 404, and to detect therefrom a proximity of the user object relative to a perpendicular direction (Z direction) away from the layer 422.

Figure 5:
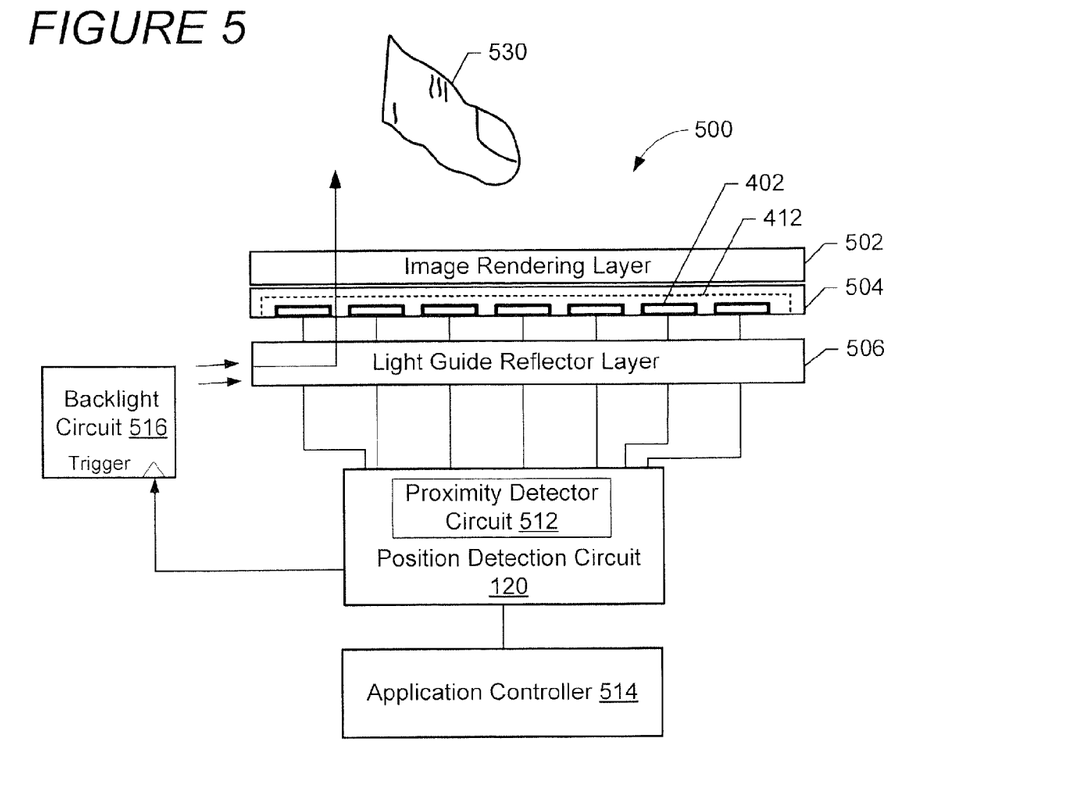
FIG. 5 is a block diagram of a display including a touch panel having capacitive proximity sensing capability according to some embodiments of the present invention.

FIG. 5 is a block diagram of a touch sensitive display 500 that is configured to sense the proximity of a user object 530, which is not touching the display 500, through capacitive coupling to the user object 530. Referring to FIG. 5, the display 500 includes an image rendering layer 502 (e.g., a liquid crystal display panel) that is configured to control light transmissivity through pixel locations therein responsive to a display control signal. A light guide 506 directs light from a backlight circuit 516 or another light source through the image rendering layer 502. The backlight circuit 516 may include one or more light emitting diodes (LEDs) and/or other light sources (e.g., electroluminescent panel) that are configured to emit light via the light guide 506 through the image rendering layer 502.

A plurality of touch sensor pads, which may be configured as described above for the touch sensor pads 402 and/or the touch sensor pads 404 shown in FIG. 4, are disposed on a touch sensing layer 504 between the image rendering layer 502 and the light guide 506. The touch sensor pads 402 and/or the touch sensor pads 404 and the proximity sensor pad 412 can extend parallel to a plane of the image rendering layer 402. The proximity sensor pad may extend along at least a portion of the edge regions of the image rendering layer 502 or the reflector layer 506, to, for example, provide structural support thereto.

The position detection circuit 120 can be configured as described above with regard to at least one embodiment of FIGS. 1-4 to generate a proximity/position signal(s) 114 that indicates when a user object has become proximately located to the touch sensitive display 500, and which may further indicate a location of the user object relative the plane of the image rendering layer 502 and relative to a direction away from (e.g., perpendicular to) the plane of the image rendering layer 502.

The position detection circuit 120 may include a proximity detector circuit 512 that generates a proximity signal that indicates when a user object has become proximately located to the touch sensitive display 500, although the user object may not yet be touching the touch sensitive display 500. The proximity detector circuit 512 may operate in accordance with at least one embodiment described above for the position detection circuit 120.

The backlight circuit 516 may turn the light source for the image rendering layer 502 on and off in response to the proximity signal from the proximity detector circuit 512. For example, the backlight circuit 516 may be configured to turn on backlighting for the image rendering layer 502 in response to the proximity detector circuit 512 detecting that a user object has become proximately located to the image rendering layer 502, and/or it may turn off backlighting for the image rendering layer 502 in response to the proximity detector circuit 512 detecting that the user object is no longer proximately located to the image rendering layer 502.

An application controller 514 can include one or more user applications that are configured to determine from the position signal output by the position detection circuit 120 a three dimensional location of the user object relative to an image that is displayed by the image rendering layer 502. Accordingly, the application controller 514 may respond to the user object becoming proximately located to the image rendering layer 502 by causing various user selectable items to be displayed by the image rendering layer 502, and/or it may respond to the user object no longer being proximately located to the image rendering layer 502 by causing various user selectable items to no longer be displayed and/or for non-user user selectable items to be displayed by the image rendering layer 502. The application controller 514 may supply the three dimensional location as a user input to various user applications.

Figure 6:
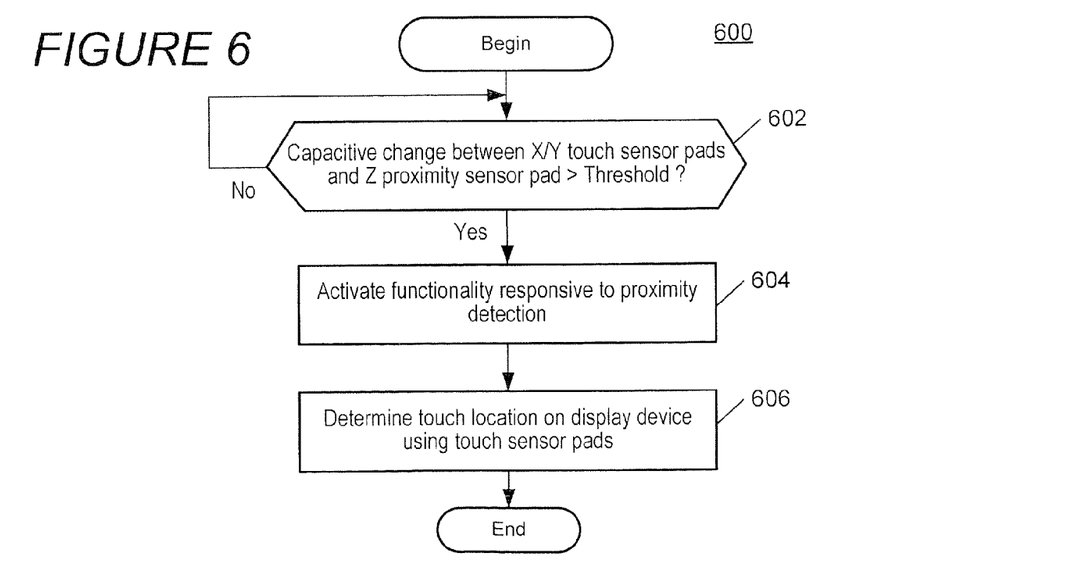
FIG. 6 is a flowchart of operations that may be carried out by the touch panel of FIG. 5 to regulate certain electronic functionality responsive to sensing proximity of a user object according to some embodiments of the present invention.

FIG. 6 is a flowchart of operations 600 that may be carried out by the touch sensitive display 500 of FIG. 5, such as by the position detection circuit 120 and the application controller 514, to regulate certain electronic functionality responsive to sensing proximity of a user object. Referring to FIG. 5, the position detection circuit 120 responds to at least a threshold change in a level of charge on the touch sensor pads 402/404 relative to a level of charge on the proximity sensor pad 412 (block 602) by determining that a user object has become proximately located thereto. The application controller 514 responds by activating various application functionality (block 604), such as by activating backlighting for the image rendering layer 502 and/or by displaying user selectable items on the image rendering layer 502. The application controller 514 may further determine a three-dimensional X, Y, and Z coordinate location of the proximately located user object (block 606) and provide that information to a user application, such as to a virtual keyboard/keypad, an electronic game, a contact database, and/or another application.

Figure 7:
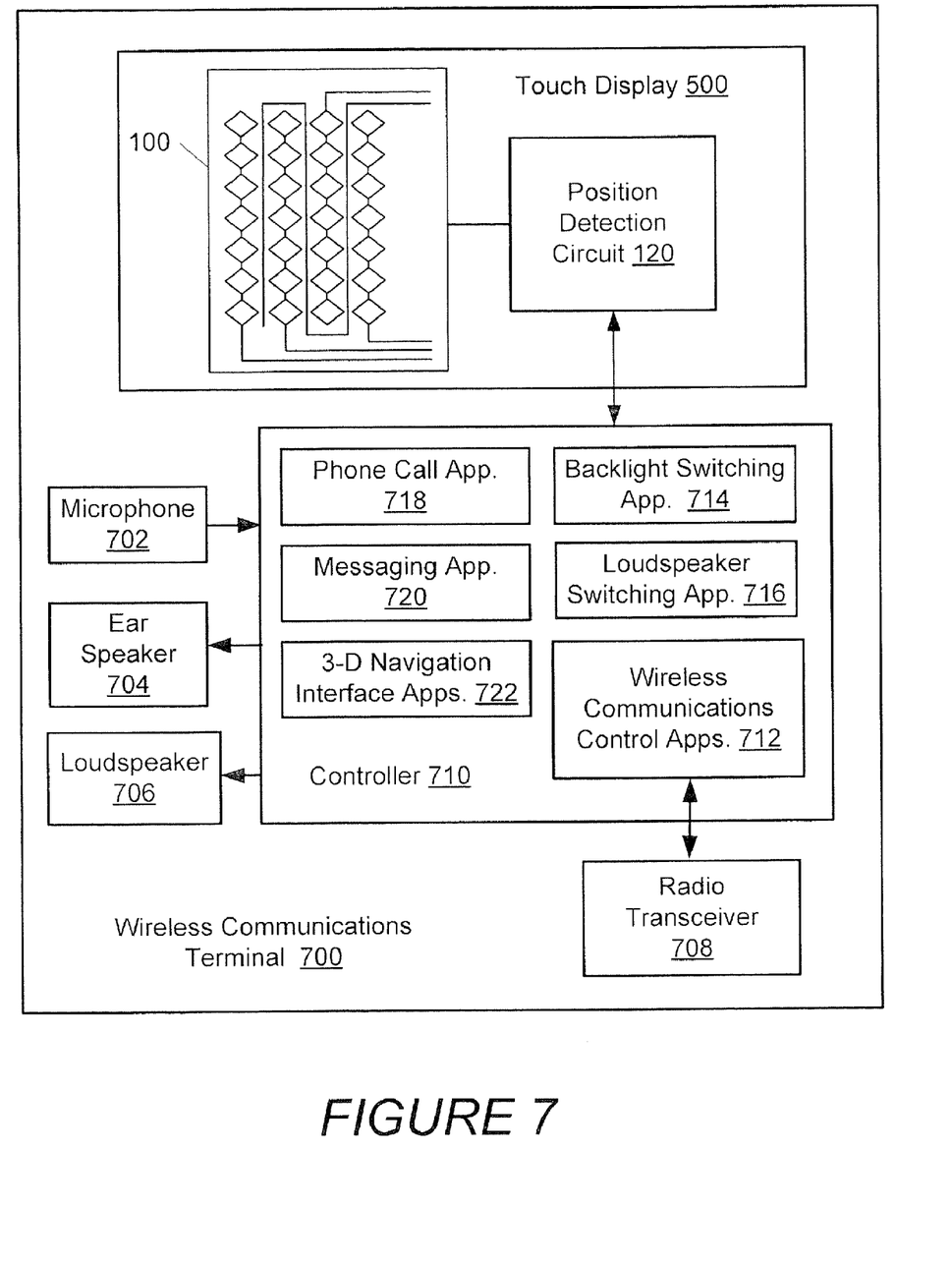
FIG. 7 is a block diagram of a wireless communications terminal including a touch panel having capacitive proximity sensing capability and an associated application functionality controller according to some embodiments of the present invention.

FIG. 7 is a block diagram of a wireless communications terminal 700 that includes a touch sensitive display 500 that is configured to sense the proximity of a user object and which may further determine the three-dimensional location of the user object relative to the display 500 and cause application functionality to respond thereto. Referring to FIG. 7, the terminal 700 further includes a controller 710, a radio transceiver 708, a microphone 702, an ear speaker 704, and a loudspeaker 706. The touch sensitive display 500 may operate as described above for the display 500 of FIG. 5.

The controller 710 (e.g., a microprocessor) executes various application programs, such as the illustrated backlight switching application 714, loudspeaker switching application 716, phone call application 718, messaging application 720, three-dimensional navigation interface applications 722, and wireless communications applications 712. Although the various applications have been shown as being carried out by a single controller, it is to be understood that their functionality may instead be carried out by more than one controller (e.g., by a DSP and a general processor) and/or by a combination of analog and digital circuits.

The wireless communication applications 712 are configured to communicate through the radio transceiver 708 over a wireless air interface with one or more RF transceiver base stations and/or other wireless communication terminals using one or more wireless communication protocols such as, for example, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, Universal Mobile Telecommunications System (UMTS), WiMAX, and/or HIPERMAN, wireless local area network (e.g., 802.11), and/or Bluetooth. The wireless communication applications 712 may be configured to carry out wireless communications functionality, such as conventional cellular phone functionality including, but not limited to, voice/video telephone calls and/or data messaging such as text/picture/video messaging.

Figure 8:
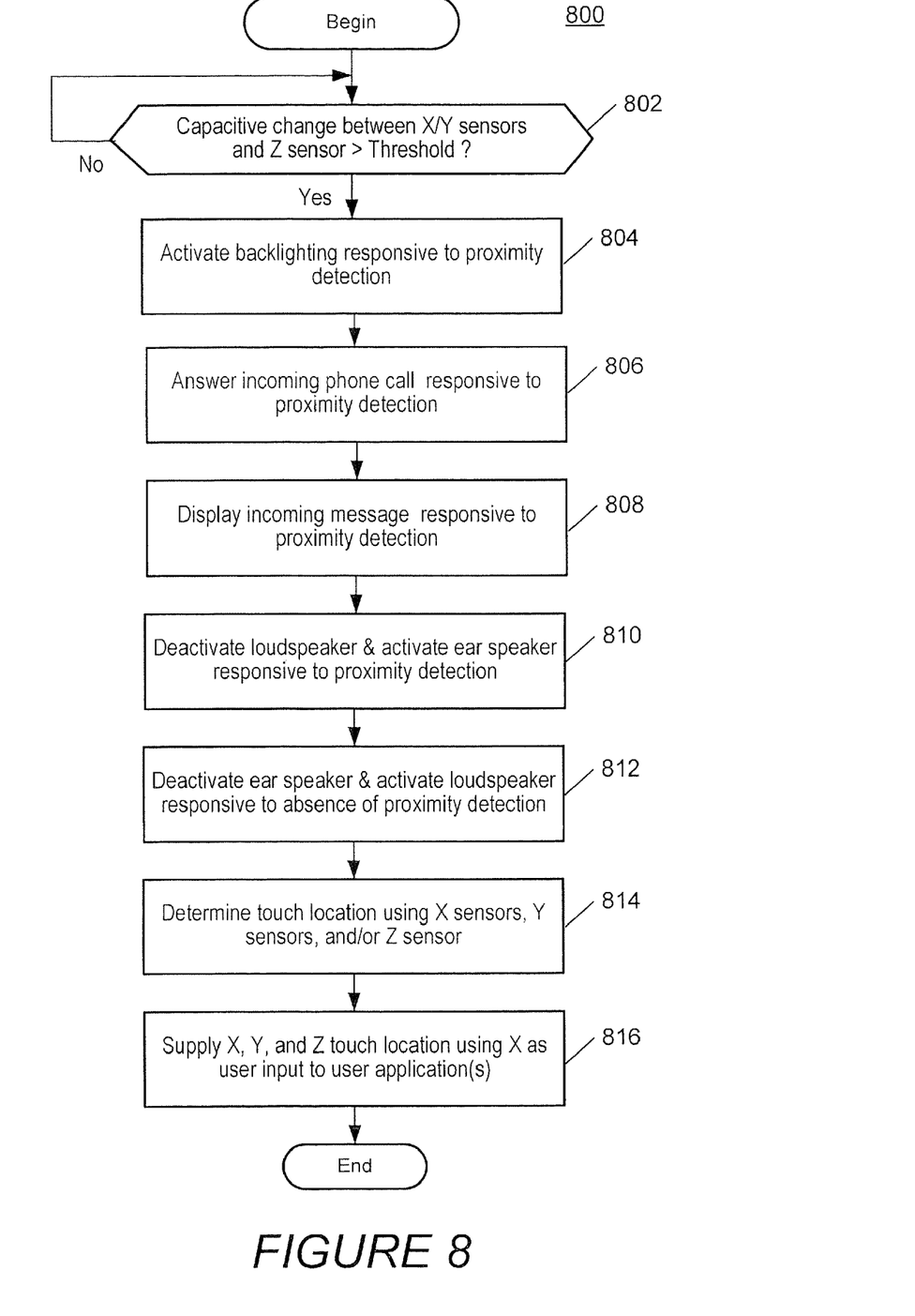
FIG. 8 is a flowchart of operations that may be carried out by the touch panel and the application functionality controller of FIG. 7 according to some embodiments of the present invention.

Various of the controller applications can respond to the proximity and/or coordinate location of a user object as determined by the position detection circuit 120. FIG. 8 is a flowchart of operations 800 that may be carried out at least in part by, for example, the controller 710 according to some embodiments of the present invention.

Referring to FIGS. 7 and 8, in response to detection of a proximately located user object, such as responsive to at least a threshold change in capacitance coupling between the proximity sensor pad 112 alone and/or compared to capacitive coupling between the touch sensor pads 102 and the user object (block 802), the backlight switching application 714 can activate backlighting for the touch display 500 (block 804).

Additionally or alternatively, the phone call application 718 may respond by answering an incoming phone call (block 806) via the wireless communication applications 712 and the radio transceiver 708, and/or the messaging application 720 may respond by displaying an incoming message (block 808).

The loudspeaker switching application 716 may deactivate the loudspeaker 706 and activate the ear speaker 704 in response to detection of a proximately located user object (block 810), so that as a user places the terminal 700 to the user's ear, the sound that is being broadcasted through the loudspeaker 706 is automatically switched to being output through the ear speaker 704. The loudspeaker switching application 716 may similarly deactivate the ear speaker 704 and activate the loudspeaker 706 in response to the user object no longer being located proximate to the terminal 700 (block 812). Accordingly, sound that was being output by the ear speaker 704 may automatically be switched to being broadcasted by the loudspeaker 706 in response to the terminal 700 being moved away from the user's ear.

The navigation interface application 722 may determine a three-dimensional coordinate location of the user object (block 814). For example, the application 722 may determine the Z dimension distance (e.g., a distance along an axis that is perpendicular to a plane of the touch display 500) to the user object based on a level of charge of the proximity sensor pad 112 and a known relationship between charge levels and approximate distances to a user object that is capacitively coupled thereto. The application 722 may determine the X and/or Y coordinate location of the user object based on relative charge levels of individual ones or columns of the touch sensor pads 102.

The navigation interface application 722 may respond to the proximity and coordinate location of the user object by activating a virtual button, feature, or function associated with or shown at that associated location on the display 500 (block 816). Various exemplary phone features that may be activated when a user object becomes proximately located to, but which may not be touching, the display 500 can include displaying a keypad/keyboard to allow a user to enter a telephone number, editing and navigating through an address book, and/or other functionality such as creating and receiving text messages and navigating to various network addresses across a wide area data network (e.g., Internet).

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An electronic touch panel comprising: a plurality of spaced apart touch sensor pads arranged in a first direction on a planar layer;
   a proximity sensor pad on the planar layer that is electrically isolated from the touch sensor pads, wherein the proximity sensor pad has a greater surface area than a plurality of the touch sensor pads; and
   a position detection circuit that is configured to electrically charge the touch sensor pads to generate capacitive coupling to an adjacent user object and detect therefrom a location of the user object relative to the first direction across the planar layer, and configured to electrically charge the proximity sensor pad to generate a higher level of capacitive coupling to the user object than a plurality of the touch sensor pads and to detect therefrom a proximity of the user object in a perpendicular direction to the planar layer;
   the touch sensor pads are arranged in a plurality of spaced apart columns, with each of the touch sensor pads being serially connected in each column and electrically isolated from touch sensor pads in other columns; and
   the proximity sensor pad extends as a continuous line on the planar layer between adjacent ones of the spaced apart columns of touch sensor pads.

2. The electronic touch panel of claim 1, wherein the position detection circuit comprises a comparator circuit that generates a proximity signal that identifies when a charge level of the proximity sensor pad reaches a threshold level to indicate that the user object has become proximately located to the proximity sensor pad and/or that the user object is no longer proximately located to the proximity sensor pad.

3. The electronic touch panel of claim 2, wherein the comparator circuit further generates a position signal that identifies when a charge level of a defined one or more of the touch sensor pads reaches a threshold level to indicate that the user object is nearly touching or touching the defined one or more of the touch sensor pads.

4. The electronic touch panel of claim 1, wherein the proximity sensor pad is wider than conductive lines that serially connect the touch sensor pads in each of the columns.

5. The electronic touch panel of claim 1, wherein:
the touch sensor pads are arranged in a plurality of spaced apart columns, with each of the touch sensor pads being serially connected in each column and electrically isolated from touch sensor pads in other columns; and
the proximity sensor pad comprises a plurality of sub-pads between adjacent ones of the spaced apart columns of touch sensor pads and that are serially connected by a line that meanders around the columns of touch sensor pads.

6. The electronic touch panel of claim 5, wherein each of the sub-pads forming the proximity sensor pad extend across at least a major portion of regions between different adjacent ones of the spaced apart columns of touch sensor pads.

7. The electronic touch panel of claim 1, wherein:
the touch sensor pads are further arranged in a plurality of spaced apart columns, with each of the touch sensor pads being serially connected in each column and electrically isolated from touch sensor pads in other columns; and
the proximity sensor pad extends as a continuous line around at least a major outside periphery of the columns of touch sensor pads.

8. The electronic touch panel of claim 7, wherein the proximity sensor pad is wider than conductive lines that serially connect the sensor pads in each of the columns.

9. The electronic touch panel of claim 1, wherein:
the touch sensor pads are arranged in a plurality of spaced apart columns and a plurality of spaced apart rows;
the touch sensor pads in each of the columns are serially connected and are electrically isolated from the touch sensor pads in other columns;
the touch sensor pads in each of the rows are serially connected and are electrically isolated from the touch sensor pads in other rows;
the proximity sensor pad extends as a continuous line around at least a major outside periphery of the rows and columns of the touch sensor pads; and
the position detection circuit is further configured to detect a location of the user object relative to the columns of touch sensor pads, relative to the rows of touch sensor pads, and relative to the proximity sensor pad in a perpendicular direction to the columns and rows of the touch sensor pads.

10. The electronic touch panel of claim 9, further comprising:
a liquid crystal display including an image rendering layer that is configured to control light transmissivity through pixel locations therein responsive to a display control signal and including a metallic reflector layer that is configured to direct light through the image rendering layer,
wherein the metallic reflector layer comprises the proximity sensor pad.

11. The electronic touch panel of claim 10, wherein the proximity sensor pad extends along at least a majority of edge regions of the image rendering layer.

12. The electronic touch panel of claim 9, further comprising:
a liquid crystal display including an image rendering layer that is configured to control light transmissivity through pixel locations therein responsive to a display control signal, wherein the rows and columns of touch sensor pads and the proximity sensor pad extend parallel to a plane of the liquid crystal display; and
the position detection circuit is further configured to generate a position signal that indicates a location of the user object relative the plane of the image rendering layer in response to relative charge levels of the touch sensor pads and relative to a direction away from the plane of the image rendering layer in response to a charge level of the proximity sensor pad.

13. The electronic touch panel of claim 9, further comprising:
a controller that includes a user application that is configured to determine from the position signal a three dimensional location of the user object relative to an image that is displayed by the image rendering layer.

14. The electronic touch panel of claim 1, further comprising:
a liquid crystal display including an image rendering layer that is configured to control light transmissivity through pixel locations therein responsive to a display control signal and including a metallic reflector layer that is configured to direct light through the image rendering layer,
wherein the metallic reflector layer comprises the proximity sensor pad.

15. The electronic touch panel of claim 1, further comprising:
a liquid crystal display including an image rendering layer that is configured to control light transmissivity through pixel locations therein responsive to a display control signal, wherein the touch sensor pads and the proximity sensor pad extend parallel to a plane of the liquid crystal display; and
the position detection circuit is further configured to generate a position signal that indicates a location of the user object relative the plane of the image rendering layer in response to relative charge levels of the touch sensor pads and relative to a direction away from the plane of the image rendering layer in response to a charge level of the proximity sensor pad.

16. The electronic touch panel of claim 1, further comprising a controller circuit that is configured to turn on backlighting for a display device in response to the position detection circuit detecting through the proximity sensor pad that the user object has become proximately located thereto.

17. The electronic touch panel of claim 1, further comprising a controller circuit that is configured to trigger a wireless terminal to answer an incoming phone call in response to the position detection circuit detecting through the proximity sensor pad that the user object has become proximately located thereto.

18. The electronic touch panel of claim 1, further comprising a controller circuit that is configured to selectively connect an ear speaker to an audio channel and to disconnect a loudspeaker from the audio channel in response to the position detection circuit detecting through the proximity sensor pad that the user object has become proximately located thereto, and to disconnect the ear speaker from the audio channel and to connect the loudspeaker to the audio channel in response to the position detection circuit detecting through the proximity sensor pad that the user object has become not proximately located thereto.

19. A touch sensitive display comprising:
an image rendering layer that is configured to control light transmissivity through pixel locations therein responsive to a display control signal;

a plurality of touch sensor pads that are arranged in a plurality of spaced apart columns on a planar layer that is connected to the image rendering layer, wherein each of the touch sensor pads are spaced apart and serially connected in each column and are electrically isolated from first sensor pads in other columns;

a proximity sensor pad on the planar layer that is electrically isolated from the touch sensor pads, wherein the proximity sensor pad has a greater surface area than a plurality of the touch sensor pads and extends as a continuous line on the planar layer between adjacent ones of the spaced apart columns of touch sensor pads; and a position detection circuit that is configured to electrically charge the touch sensor pads to generate capacitive coupling to an adjacent user object and detect therefrom a location of the user object relative to a direction across the image rendering layer, and configured to electrically charge the proximity sensor pad to generate a higher level of capacitive coupling to the user object than a plurality of the touch sensor pads and to detect therefrom a proximity of the user object in a perpendicular direction to the image rendering layer.

* * * * *